United States Patent
Thier

(10) Patent No.: US 7,155,398 B2
(45) Date of Patent: Dec. 26, 2006

(54) CASCADED PLANNING OF AN ENTERPRISE PLANNING MODEL

(75) Inventor: Adam Thier, Eden Prairie, MN (US)

(73) Assignee: Cognos Incorporated, Ottawa (CA)

( * ) Notice: Subject to any disclaimer, the term of this patent is extended or adjusted under 35 U.S.C. 154(b) by 170 days.

(21) Appl. No.: 10/370,183

(22) Filed: Feb. 19, 2003

(65) Prior Publication Data

US 2004/0162744 A1    Aug. 19, 2004

(51) Int. Cl.
*G06Q 10/00*    (2006.01)
(52) U.S. Cl. .......................................... 705/7
(58) Field of Classification Search ............ 705/1, 705/7
See application file for complete search history.

(56) References Cited

U.S. PATENT DOCUMENTS

| | | | |
|---|---|---|---|
| 5,172,313 A | 12/1992 | Schumacher | |
| 5,381,332 A | 1/1995 | Wood | |
| 5,406,477 A | 4/1995 | Harhen | |
| 5,461,699 A | 10/1995 | Arbabi et al. | |
| 5,524,253 A | 6/1996 | Pham et al. | |
| 5,774,868 A | 6/1998 | Cragun et al. | |
| 5,799,286 A | 8/1998 | Morgan et al. | |
| 5,974,395 A * | 10/1999 | Bellini et al. | 705/9 |
| 6,023,702 A | 2/2000 | Leisten et al. | |
| 6,067,525 A | 5/2000 | Johnson et al. | |
| 6,067,548 A * | 5/2000 | Cheng | 707/103 R |
| 6,073,108 A | 6/2000 | Peterson | |
| 6,151,601 A | 11/2000 | Papierniak et al. | |
| 6,161,051 A | 12/2000 | Hafemann et al. | |
| 6,161,103 A | 12/2000 | Rauer et al. | |
| 6,169,534 B1 | 1/2001 | Raffel et al. | |
| 6,173,310 B1 | 1/2001 | Yost et al. | |
| 6,182,060 B1 | 1/2001 | Hedgcock et al. | |
| 6,385,301 B1 | 5/2002 | Nolting et al. | |
| 6,385,604 B1 | 5/2002 | Bakalash et al. | |
| 6,397,191 B1 | 5/2002 | Notani et al. | |
| 6,411,936 B1 * | 6/2002 | Sanders | 705/10 |
| 6,418,420 B1 | 7/2002 | DiGiorgio et al. | |
| 6,424,979 B1 | 7/2002 | Livingston et al. | |
| 6,430,539 B1 | 8/2002 | Lazarus et al. | |
| 6,434,544 B1 | 8/2002 | Bakalash et al. | |
| 6,496,831 B1 | 12/2002 | Baulier et al. | |
| 6,687,713 B1 | 2/2004 | Mattson et al. | |

(Continued)

FOREIGN PATENT DOCUMENTS

EP    0294187 A2    6/1988

(Continued)

OTHER PUBLICATIONS

Adaytum Software, www.adaytum.co.uk, Apr. 2, 1998 [retrieved Dec. 20, 2004], pp. 1-25, retrieved from: Google.com and archive.org.*

(Continued)

*Primary Examiner*—Romain Jeanty
*Assistant Examiner*—B. Van Doren
(74) *Attorney, Agent, or Firm*—Shumaker & Sieffert, P.A.

(57) ABSTRACT

In general, the invention is directed to techniques for developing an enterprise planning model in cascaded planning stages. For example, an enterprise planning system receives data that defines an enterprise planning session from a set of analysts in cascaded planning stages. The analysts associated with each subsequent planning stage refine the enterprise planning model defined by analysts associated with previous planning stages. In this manner, the set of analysts may define an enterprise planning model that may allow large, diverse organizations to establish planning standards across dozens or hundreds of business units, while allowing the business units to extend the planning standards to further refine the planning sessions.

38 Claims, 6 Drawing Sheets

U.S. PATENT DOCUMENTS

| | | | |
|---|---|---|---|
| 2001/0027455 A1 | 10/2001 | Abulleil et al. | |
| 2001/0044738 A1* | 11/2001 | Elkin et al. | 705/8 |
| 2002/0042755 A1 | 4/2002 | Kumar et al. | |
| 2002/0049701 A1 | 4/2002 | Nabe et al. | |
| 2002/0082892 A1 | 6/2002 | Raffel et al. | |
| 2002/0087523 A1 | 7/2002 | Sivaraman | |
| 2002/0129003 A1 | 9/2002 | Bakalash et al. | |
| 2002/0143755 A1 | 10/2002 | Wynblatt et al. | |
| 2002/0169658 A1 | 11/2002 | Adler | |
| 2003/0018510 A1* | 1/2003 | Sanches | 705/9 |
| 2003/0084053 A1 | 5/2003 | Govrin et al. | |
| 2003/0130877 A1* | 7/2003 | Farnes et al. | 705/7 |
| 2003/0144894 A1 | 7/2003 | Robertson et al. | |
| 2004/0039625 A1* | 2/2004 | Malnack et al. | 705/9 |
| 2004/0045014 A1 | 3/2004 | Radhakrishnan | |
| 2004/0064327 A1* | 4/2004 | Humenansky et al. | 705/1 |
| 2004/0064349 A1* | 4/2004 | Humenansky et al. | 705/7 |
| 2004/0128185 A1 | 7/2004 | Tsai | |
| 2004/0138942 A1* | 7/2004 | Pearson et al. | 705/10 |
| 2004/0143470 A1 | 7/2004 | Myrick et al. | |
| 2004/0186762 A1* | 9/2004 | Beaven et al. | 705/8 |

FOREIGN PATENT DOCUMENTS

| | | |
|---|---|---|
| WO | WO 94/18620 A1 | 8/1994 |
| WO | WO 96/30852 | 10/1996 |
| WO | WO 02/11041 A1 | 2/2002 |
| WO | WO 02/19224 A1 | 3/2002 |

OTHER PUBLICATIONS

Simon, Gary, "Plan to Throw Away your Spreadsheet!: A product Review of Adaytum Planning", Deloitte & Touche, Apr. 1998 [retrieved Dec. 5, 2005], pp. 1-4, retrieved from: archive.org and www.adaytum.co.uk.*

Teach, Edward, "Budgeting and Planning: Planning for the Masses", CFO Magazine, Mar. 2000 [retrieved Dec. 5, 2005], pp. 1-3, retrieved from: Archive.org and www.adaytum.co.uk.*

Adaytum Software, www.adaytum.co.uk, Mar. 4, 2001 [retrieved Dec. 5, 2005], pp. 1-41, retrieved from: Archive.org and google.com.*

"Adaytum Software Announces Industry's First Financial Planning and Modeling Solution", Business Wire, Nov. 9, 1998 [retrieved Dec. 5, 2005], pp. 1-9, retrieved from: Dialog, file 20.*

"Delivering Double Decker Budgets at Pizza Hut UK", www.adaytum.co.uk, Jul. 12, 2000 [retrieved Dec. 5, 2005], pp. 1-4, retrieved from: Archive.org and adaytum.co.uk.*

"Crate and Barrel Drives Expansion with Confidence and Accuracy Using Adaytum E.Planning", www.adaytum.com, Aug. 19, 2000 [retrieved Dec. 5, 2005], pp. 1-12, retrieved from: Archive.org and adaytum.com.*

"Checking on Profitability", www.adaytum.co.uk, Jul. 9, 2000 [retrieved Dec. 5, 2005], pp. 1-4, retrieved from: archive.org and www.adaytum.co.uk.*

"Flexible Planning at Birmingham Midshires", www.adaytum.co.uk, May 21, 2000 [retrieved Dec. 5, 2005], pp. 1-3, retrieved from: Archive.org and www.adaytum.co.uk.*

Meyer, Gary, "eWorkBench: Real-Time Tracking of Synchronized Goals", HR Magazine, Apr. 2001, pp. 1-3.*

U.S. Appl. No. 09/575,599 entitled "Revenue Forecasting and Sales Force Management Using Statistical Analysis," filed May 22, 2000, Adam Their.

U.S. Appl. No. 09/628,479 entitled "Budget Planning," filed Jul. 31, 2000, Adam Thier et al.

U.S. Appl. No. 10/370,182 entitled "Horizontal Enterprise Planning in Accordance with an Enterprise Planning Model," filed Feb. 19, 2003, Adam Thier.

MacKay Neural Computation, 1992, 4(3): 415-447.

MacKay Neural Computation, 1992, 4(3): 448-472.

MacKay Neural Computation, 1992, 4(5): 720-735.

International Search Report and Written Opinion from corresponding International Application No. PCT/US04/03326 mailed Jan. 21, 2005 (9 pages).

"Microsoft Press Computer Dictionary," 1997, Microsoft Press, Third Edition, p. 130.

U.S. Appl. No. 10/262,591 entitled "Real-Time Aggregation of Data Within an Enterprise Planning Environment," filed Sep. 30, 2002, by Adam Thier et al.

U.S. Appl. No. 10/675,909 entitled "Node-Level Modification During Execution of an Enterprise Planning Model," filed Sep. 30, 2003, by George Duncan Pearson et al.

U.S. Appl. No. 10/262,590 entitled "Selective Deployment of Software Extensions Within an Enterprise Modeling Environment," filed Sep. 30, 2002, by Brian S. Humenansky et al.

U.S. Appl. No. 10/262,606 entitled "Inline Compression of a Network Communication Within an Enterprise Planning Environment," filed Sep. 30, 2002, by Brian S. Humenansky et al.

U.S. Appl. No. 10/262,651 entitled "Deploying Multiple Enterprise Planning Models Across Clusters of Application Servers," filed Sep. 30, 2002, by Brian S. Humenansky et al.

* cited by examiner

CASCADED PLANNING OF AN ENTERPRISE PLANNING MODEL

TECHNICAL FIELD

The invention relates to computer-implemented techniques for enterprise business planning.

BACKGROUND

Many enterprises are responsible for establishing accurate forecasts for enterprise operations. Failing to meet established expectations can have significant negative impact on the enterprise in the areas of cash flow, stock price, liquidity, and investor faith, among other areas. Examples of enterprise planning activities for which accuracy is critical include revenue forecasting, inventory management, resource planning, and the like. Enterprise business planning, however, is a difficult and expensive task that often produces inaccurate results.

Conventionally, enterprises have taken either a "top-down" or a "bottom-up" approach to enterprise planning. Bottom-up planning involves the aggregation of low-level forecasts from the lowest cost centers of an organization. For budget planning, for example, management personnel may be required to periodically forecast expenses, and allocate the expenses to a number of categories, such as advertisement, travel, and salaries. However, the bottom-up forecasts rarely, if ever, reconcile with top-down business targets. In top-down planning, enterprises identify fundamental business targets, such as average product price, cost per employee, and the like, and push the targets down through the hierarchical structure of the enterprise. However, in performing top-down planning, large, diverse enterprises may develop planning models that do not fit the needs of all the business units of the enterprise.

SUMMARY

In general, the invention is directed to cascaded planning techniques that improve the accuracy and predictability of budget planning within enterprises. More specifically, the techniques enable a set of enterprise analysts to define an enterprise planning session in "cascaded planning stages." In general, the term "cascaded planning stages" is used to refer to a planning process that flows from a top level of an organization to a bottom level to develop a complete enterprise model. Allowing the set of analysts to define the enterprise planning model in cascaded planning stages may allow large, diverse organizations to establish planning standards across dozens or hundreds of business units, while allowing the business units to extend the planning standards to further refine the planning sessions.

As described herein, the series of analysts develop, through the cascaded planning stages, an enterprise planning model in accordance with which an enterprise planning session is carried out. More particularly, the analysts develop an enterprise planning model for the enterprise having an enterprise hierarchy that includes a number of hierarchically arranged nodes representing various cost centers within the enterprise, such as business units or departments. The analysts may further establish corporate target data for the enterprise. The analysts may, for example, establish corporate target data for each node of the enterprise hierarchy. The analysts then assign one or more enterprise users that are responsible for enterprise planning to corresponding nodes of the hierarchy. Finally, the analysts may define a number of templates for collecting contribution data from contributors. The set of analysts may include the corporate target data in the templates to facilitate reconciliation with the contribution data.

For example, an enterprise planning system may receive model data that defines at least a portion of an enterprise planning model from an analyst associated with a first level of the hierarchically arranged nodes in a first cascaded planning stage. The model data received from the analyst may define, for example, corporate target data for the nodes, enterprise users associated with the nodes, and templates for collecting contribution data to be used in an enterprise planning session. The analyst may define a portion of the enterprise planning model or the entire enterprise planning model. The analyst may, for example, be the enterprise user assigned to the highest level node.

Upon the analyst associated with the first level node defining the enterprise planning model, analysts associated with lower level nodes of the enterprise hierarchy, interact with the enterprise planning system to further define or refine the enterprise planning model. In particular, analysts associated with lower level nodes may refine the model data input by analyst during the first cascaded planning stage. For instance, the analyst associated with the higher level node may define corporate target data for a lower level node associated with an analyst. The analyst associated with the lower level node may refine the distribution of the defined corporate target data among nodes further down the hierarchy. In this manner, each subsequent cascaded planning stage refines model data and parameters defined by analysts of the previous cascaded planning stage.

The enterprise planning system executes the remaining phases of the enterprise planning session, i.e., a contribution phase and a reconciliation phase in accordance with the defined enterprise planning model.

In one embodiment, the invention provides a method comprising receiving model data that defines an enterprise planning model from a set of enterprise users in subsequent planning stages, wherein the enterprise users of each subsequent planning stage refine data from the previous planning stages. The method further includes executing an enterprise planning session in accordance with the defined enterprise planning model.

In another embodiment, the invention provides a system comprising an analysis module to interact with a set of enterprise users to obtain data that defines an enterprise planning model in subsequent planning stages, wherein the enterprise users associated with each subsequent planning stage refine data from the previous planning stages. The system further includes a database to store the data that defines the enterprise planning model. The system executes an enterprise planning session in accordance with the data stored in the database that defines an enterprise planning model.

In another embodiment, the invention provides computer-implemented method comprising presenting an interface to receive model data from a set of enterprise users associated with a multi-level enterprise hierarchy, wherein the model data defines an enterprise planning model, and the enterprise users associated with each level refine the model data received from the enterprise users associated with higher levels of the hierarchy. The method further includes constraining the model data defined by enterprise users associated with lower levels with the model data defined by enterprise users associated with higher levels. The method also comprises executing an enterprise planning session in accordance with the defined enterprise planning model via a computer network.

The invention may offer one or more advantages. For example, the techniques described herein may allow more flexibility in defining an enterprise planning session. For example, a large, diverse enterprise may establish planning standards across dozens or hundreds of business units, while allowing the business units to extend the enterprise planning session to accommodate the needs of particular cost centers. Analysts of business units may be much more familiar with the forecasting methods implemented by the business unit, and may shape the enterprise planning session to incorporate those forecasting methods.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
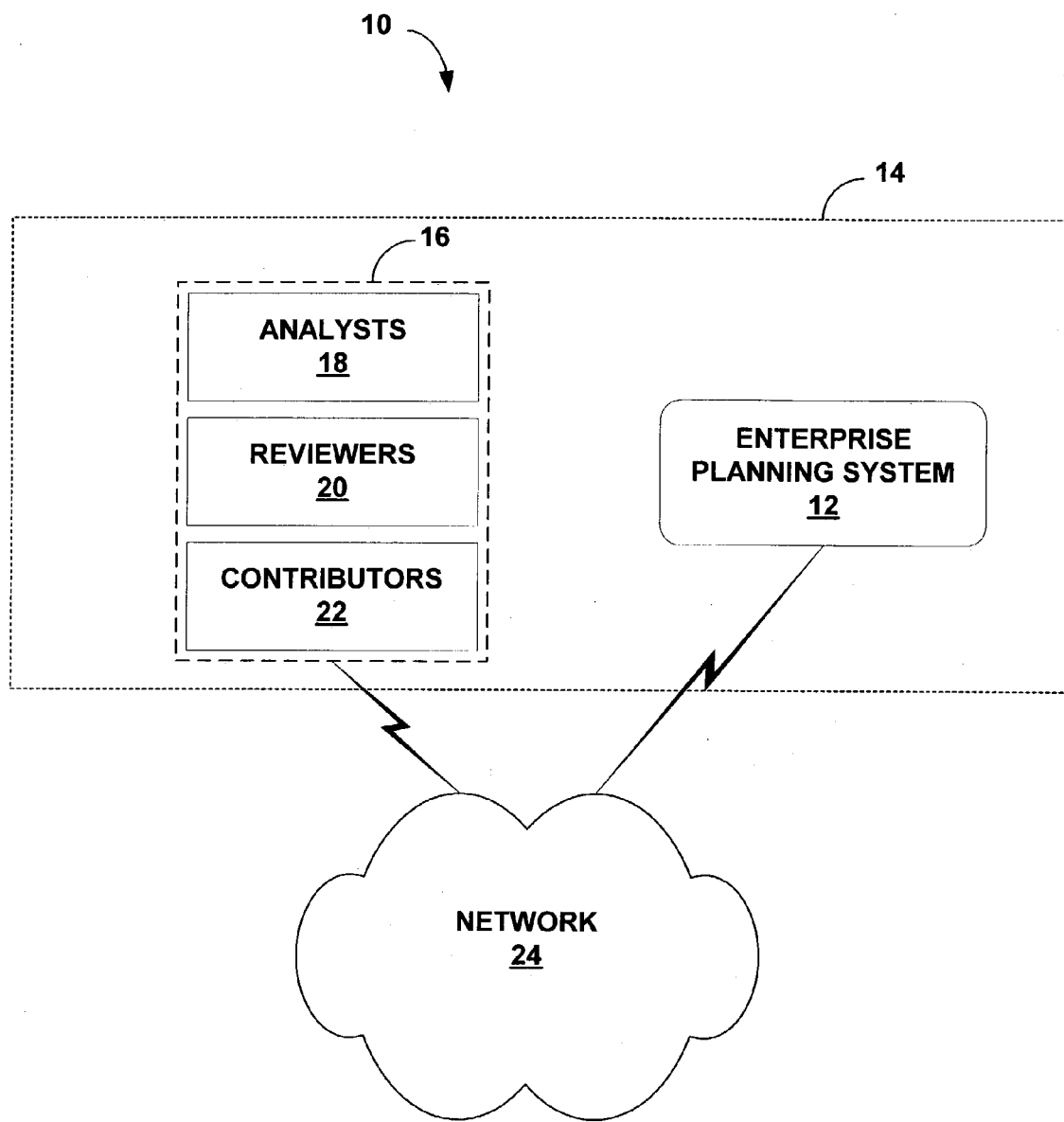
FIG. 1 is a block diagram illustrating a computing environment in which an enterprise planning system utilizes cascaded enterprise planning techniques in accordance with the invention.

FIG. 1 is a block diagram illustrating a computing environment 10 in which an enterprise planning system 12 utilizes cascaded enterprise planning techniques in accordance with the invention. As will be described, enterprise planning system 12 may be configured to enable a set of enterprise users 16, and more particularly, a set of analysts 18 to define an enterprise planning model in "cascaded planning stages". In general, the term "cascaded planning stages" is used to refer to planning stages that flow from a top level of an organization to a bottom level. In particular, analysts at each level depend on, and further define, model input provided by the higher-level analysts.

In general, enterprise planning system 12 executes an enterprise planning session that includes three phases of enterprise planning: (1) a modeling phase, (2) a contribution phase, and (3) a reconciliation phase. In the modeling phase, analysts 18 define an enterprise planning model in cascaded planning stages. The enterprise planning model defined by the set of analysts 18 includes, for example, a planning hierarchy for enterprise 14, corporate target for the nodes, e.g., cost centers, within the enterprise hierarchy, templates for collecting data from enterprise contributors associated with the nodes, and the like.

More particularly, analysts 18 develop an enterprise planning model for enterprise 14 in accordance with an enterprise hierarchy that includes a number of hierarchically arranged nodes. Each node represents a cost center within enterprise 14, such as business units or departments. As described in detail herein, each of analysts 18 is associated with at least one of the hierarchically arranged nodes. Analysts associated with the higher levels provide initial model data, which is refined by analysts associated with the lower levels. In this manner, the model creation process can be viewed as "cascading" down the defined hierarchy, until analysts 18 associated with the lowest levels of the hierarchy finalize the details of the enterprise planning model. Accordingly, the term "cascaded planning" is used to refer to this type of process in which the process of creating an enterprise planning model flows from a top level of an organization to a bottom level. In particular, analysts at each level depend on, and further define, model input provided by the higher-level analysts.

In general, analysts 18 establish corporate targets, e.g., financial targets, for enterprise 14 during the modeling phase. More specifically, analysts 18 establish corporate targets for each node of the enterprise hierarchy. In addition, analysts 18 assign one or more enterprise users 16 to each node that is responsible for the enterprise planning of the cost center associated with the node. As illustrated by FIG. 1, enterprise users 16 assigned to the nodes may be designated as analysts 18, reviewers 20, contributors 22, or a combination thereof. Enterprise users 16 may be authorized users within enterprise 14 and may include, for example, chief financial officers, senior financial analysts, product analysts, sales analysts, managers, supervisors, sales representatives, lab managers, or the like. Finally, analysts 18 may define a number of templates for collecting contribution data from contributors 22. Analysts 18 may include the corporate target data in the templates to facilitate reconciliation with the contribution data.

In accordance with the invention, the modeling phase of the enterprise planning session occurs in cascaded planning stages. More particularly, one or more analysts 18 define or refine a portion of the enterprise planning model at each planning stage, i.e., level. At each stage, enterprise planning system 12 receives from an analyst 18 model data that defines at least a portion of an enterprise planning model. For example, an analyst 18 associated with the highest node, e.g., a chief financial officer of the enterprise, may define enterprise-wide targets. Analysts 18 associated with lower level nodes, may create more detailed targets for business units based on the enterprise-wide targets. In other words, analysts 18 associated with lower-level nodes of the enterprise hierarchy interact with enterprise planning system 12 to further define or refine the enterprise planning model based on the model define by higher-level analysts 18. In this manner, each subsequent cascaded planning stage refines model data and parameters defined by analysts 18 of the previous cascaded planning stage. This process continues in cascade-fashion until the entire model has been defined, and can be used at the basis for an enterprise planning session.

Once the model has been defined, enterprise planning system 12 executes the remaining phases of the enterprise planning session, i.e., the contribution phase and the reconciliation phase, in accordance with the defined enterprise planning model. More specifically, upon completion of the modeling phase in cascaded fashion, enterprise planning system 12 enters the contribution phase during which contributors 22 interact with enterprise planning system 12 and input detailed forecasts in the form of contribution data. For example, contributors 22 may provide detailed financial forecasts, revenue forecasts, order forecasts, inventory forecasts, estimated resource requirements, and the like, depending on the particular enterprise planning activity being carried out by enterprise 14.

During the reconciliation phase, enterprise planning system 12 automates the reconciliation of the contribution data with the corporate target data provided by analysts 18. In particular, enterprise planning system 12 operates in accordance with the defined enterprise planning model to provide a hierarchical planning process having multiple reconciliation levels. As each of contributors 22 provides respective contribution data, enterprise planning system 12 automatically aggregates the contribution data across enterprise 14 in real-time, and provides reviewers 20 associated with higher level nodes of the enterprise hierarchy with access to the aggregated data. In particular, upon receiving contribution data from contributors 22, enterprise planning system 12 identifies all higher level nodes of the enterprise model affected by the newly received contribution data, and calculates new aggregate totals at each level in real-time.

Reviewers 20 view aggregated data across enterprise 14 in real-time during the enterprise planning session. At each level, enterprise planning system 12 ensures that reviewers 20, as defined by the nodes of the enterprise hierarchy, reconcile the target data with the contribution data. Each reviewer 20 may, for example, reject or accept the contribution data in view of corporate target data provided by analysts 18. This process continues until the contribution data is ultimately approved by enterprise user 16 associate with the highest-level node of the enterprise hierarchy, thereby ensuring that the contribution data from contributors 22 reconciles with corporate target data provided by analysts 18.

Enterprise users 16 may interact with enterprise planning system 12 via a network 24. Enterprise users 16 may directly access enterprise planning system 12 via a local area network, or may remotely access enterprise planning system 12 via a virtual private network, remote dial-up, or similar remote access communication mechanism. Network 24 represents any communication network, such as a packet-based digital network like the Internet. Further network 24 may be a local area network (LAN), a wide area network (WAN), a wireless local area network (WLAN), or the like. In this manner, system 10 can readily scale to suit large enterprises. Enterprise users 16 may use a variety of computing devices to interact with enterprise planning system 12 via network 24. For example, enterprise users 16 may interact with enterprise planning system 12 using a laptop computer, desktop computer, or the like. Alternatively, enterprise users 16 may use a personal digital assistant (PDA), a web-enabled cellular phone, or similar device.

Figure 2:
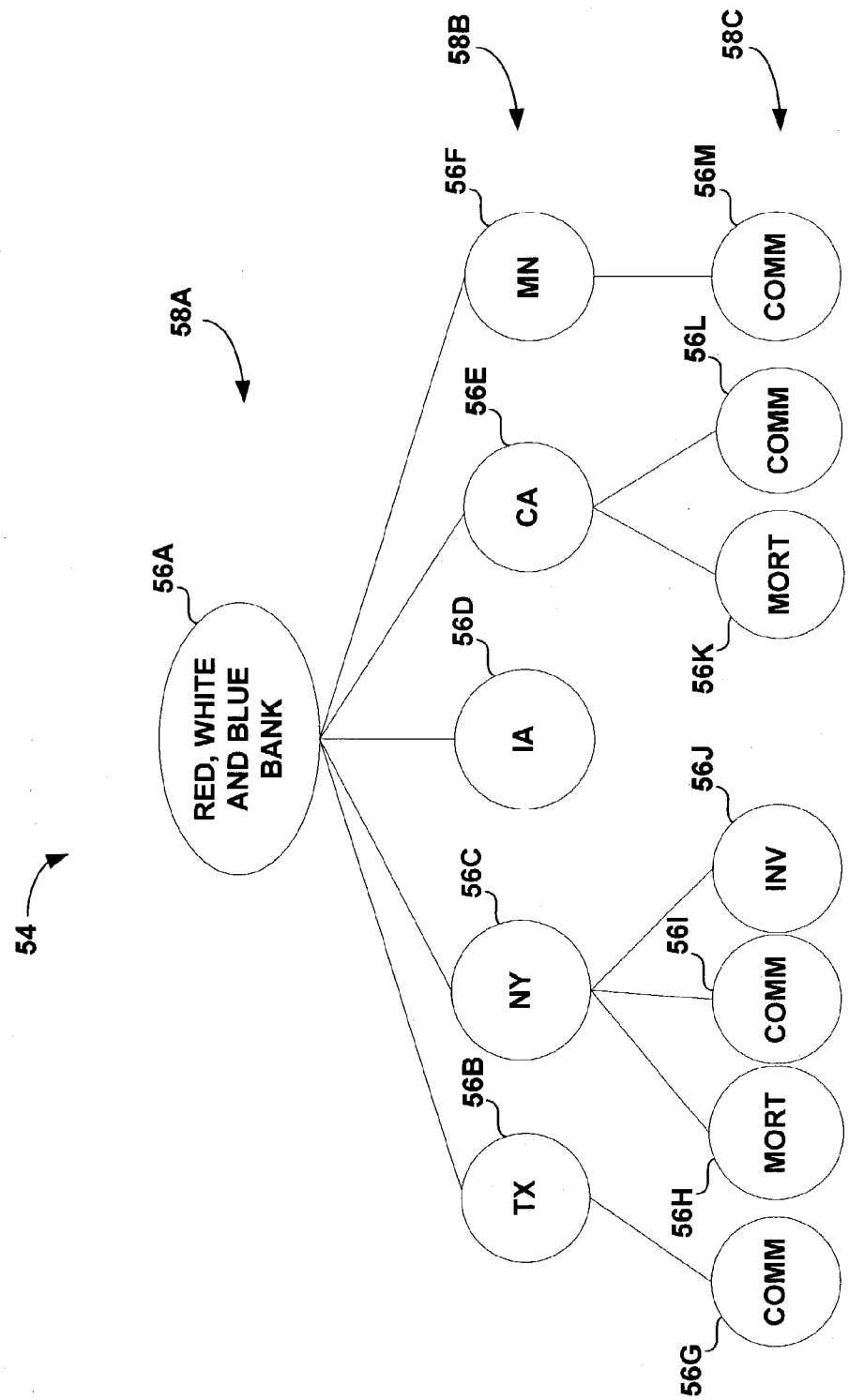
FIG. 2 is a schematic diagram illustrating an example enterprise hierarchy used to create an enterprise planning model in cascaded fashion.

FIG. 2 is a schematic diagram illustrating an example enterprise hierarchy 54 of an enterprise used to create an enterprise planning model in cascaded fashion. A set of analysts 18 may interact with enterprise planning system 12 in accordance with hierarchy 54 to define the enterprise planning model in cascaded planning stages, as described above. The set of analysts 18 may, for example, define the enterprise planning model in cascaded planning stages in accordance with enterprise hierarchy 54.

Enterprise hierarchy 54 includes nodes 56A–56M ("nodes 56") vertically organized into reconciliation levels 58A–58C ("reconciliation levels 58"). In the example of FIG. 2, nodes 56 of enterprise hierarchy 54 are vertically organized into three reconciliation levels 58. Although illustrated in the example of FIG. 2 as having three reconciliation levels 58, analysts 18 may define the enterprise planning session to have any number of reconciliation levels 58.

Enterprise hierarchy 54 may further be organized horizontally based on various attributes of enterprise 14. For example, enterprise hierarchy 54 may be horizontally organized based on various geographic regions occupied by enterprise 14, various business units within enterprise 14, or the like. Further, enterprise hierarchy 54 may be horizontally organized based on a combination of enterprise attributes. In the example of FIG. 2, reconciliation level 58B of enterprise hierarchy 54 is horizontally organized based on geographic location occupied by enterprise 14 while reconciliation level 58C is organized based on business units within enterprise 14. More particularly, enterprise 14 of FIG. 2 is a fictitious banking corporation (Red, White and Blue Bank) that has branches operating in multiple states in the United States. Reconciliation level 58B may be horizontally organized based on the state in which branches are located and operated. For example, nodes 56B-56F may correspond to branches of Red, White and Blue Bank in Texas (TX), New York (NY), Iowa (IA), California (CA), and Minnesota (MN), respectively. Reconciliation level 58C may be horizontally organized based on baseline departments such as the mortgage (MORT) banking department, commercial (COMM) banking department, investment (INV) banking department and the like. Red, White and Blue Bank of New York, for example, may include a mortgage banking department, a commercial banking department, and an investment banking department.

As described above, the enterprise planning model may be defined by a set of analysts 18 in cascaded planning stages in accordance with enterprise hierarchy 54. An analyst 18 associated with node 56A defines an enterprise planning model for enterprise 14. Analyst 18 associated with node 56A may, for example, define corporate target data for lower level nodes, enterprise users 16 associated with lower level nodes and templates for collecting data from contributors 22. Analyst 18 associate with node 56A may further refine the structure of enterprise hierarchy 54. Alternatively, analyst 18 associated with node 56A may only define a portion of the enterprise planning model. For example, analyst 18 associated with node 56A may only define model data for nodes 56B–56F of reconciliation level 58B of enterprise hierarchy 54.

More specifically, analyst 18 associated with node 56A may assign one or more enterprise users 16 to each of nodes 56B–56M and designate each of the enterprise users 16 as analysts 18, reviewers 20, contributors 22, or a combination thereof. Enterprise users designated as analysts 18 may extend the enterprise planning model to personalize the enterprise planning model to lower level nodes 56 as will be described. Enterprise users designated as contributors 22 provide contribution data to enterprise planning system 12 and enterprise users designated as reviewers 20 accept or reject contribution data provided by contributors 22.

Analyst 18 associated with node 56A may further establish corporate target data for each of nodes 56 of enterprise hierarchy 54 or for a portion of nodes 56. Analyst 18 associated with node 56A may, for example, define a revenue target for each node 56 of hierarchy 54. Alternatively, analyst 18 associated with node 56A may only define revenue targets for nodes of one or more reconciliation levels 58. Analyst 18 associated with node 56A also defines a number of templates for collecting forecast data from contributors 22. The templates include the established corporate target data to facilitate reconciliation with the contribution data input by contributors 22. Enterprise planning system 12 may associate one or more of the templates with enterprise users designated as contributors 22. For example, enterprise planning system 12 may associate a subset of the templates to nodes 56B and 56F and a different subset of templates to node 56C, 56D, and 56E.

Upon analyst 18 associated with node 56A submitting the defined enterprise planning model, enterprise planning system 12 notifies analysts 18 associated with the subsequent cascaded planning stage that they may interact with enterprise planning system 12 to refine the enterprise planning model defined by analysts 18 of previous planning stages.

Analysts 18 associated with nodes 56 of the subsequent cascaded planning stage may access the model data defined by analysts 18 associated with node 56A and refine the enterprise planning model data. Analysts 18 associated with nodes 56 of the subsequent cascaded planning stage may, for example, modify the enterprise planning model to meet the needs of contributors 22 or cost centers associated with nodes further down enterprise hierarchy 54.

Analysts 18 may modify the enterprise planning model by refining enterprise hierarchy 54, corporate target data defined by analysts 18 associated with higher level nodes, or templates for collecting contribution data from contributors 22. Refining enterprise hierarchy 54 may include, for example, adding or deleting nodes to lower levels of hierarchy 54, updating enterprise users 16 associated with nodes of lower levels, changing the designation of enterprise users 16 associated with nodes of lower levels, and the like. Refining corporate target data defined by analysts 18 associated with higher level nodes may include, for example, redistributing the corporate target data among nodes further down enterprise hierarchy 54. Refining templates for collecting contribution data from contributors 22 may include, for example, further modifying a template to obtain more detailed contribution data from contributors 22 associated with lower level nodes.

The cascaded planning process continues until all analysts 18 of enterprise hierarchy 54 have had an opportunity to refine the model data defined by analysts 18 associated with higher-level nodes. In this manner, the enterprise planning model is defined by a set of analysts 18 in cascaded planning stages. In order to speed up the modeling phase, analysts 18 may have to make any refinements to the enterprise planning model within a certain time frame after being notified.

Once the model has been defined, enterprise planning system 12 executes the remaining phases of the enterprise planning session in accordance with the enterprise planning model. More specifically, enterprise planning system 12 initiates the process of receiving contribution data from the lowest level of enterprise hierarchy 54, e.g., nodes 56G–56M of reconciliation level 58C in the example of FIG. 2. Contributors 22 of nodes 56G–56M are, for example, notified to complete the defined templates, which may be accessed via enterprise planning system 12. According to the model, each node 56 of hierarchy 54 may be associated with one or more corresponding templates 50, depending upon the level the node resides on within the hierarchy 54. Contributors 22 provide contribution data to enterprise planning system 12 via associated templates 50.

When contributors 22 submit the contribution data, reviewers 20 of nodes 56 of the next reconciliation level, i.e., reconciliation level 58B either accept or reject the contribution data based on the defined corporate targets. Contribution data that is rejected is sent back to associated contributors 22. The reconciliation process continues until enterprise user 16 associated with the highest level node, i.e., node 46A, has accepted all of the contribution data.

Figure 3:
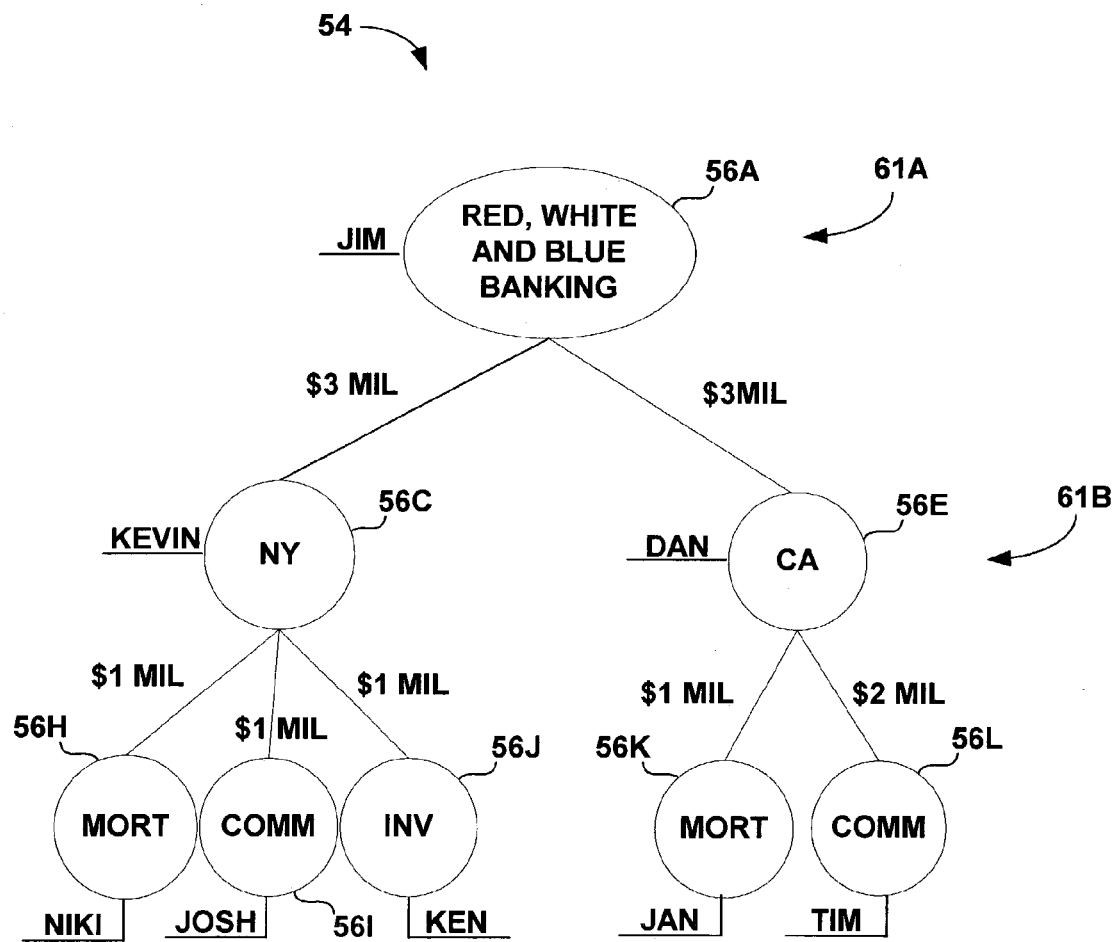
FIG. 3 is a block diagram illustrating a portion of the enterprise hierarchy of FIG. 2 to illustrate the cascaded planning stages of a modeling phase.

FIG. 3 is a schematic diagram providing an example of the cascaded planning process. In particular, FIG. 3 illustrates a portion of the cascaded planning stages carried out in accordance with enterprise hierarchy 54 (FIG. 2). In this example, cascaded planning stages 61A and 61B ("cascaded planning stages 61") are illustrated. Nevertheless, the complete modeling phase may include any number of cascaded planning stages.

In this example, cascaded planning stage 61A includes a single node 56A. An analyst 18 associated with node 56A, i.e., Jim, defines at least a portion of an enterprise planning model. In the example of FIG. 3, Jim defines revenue targets for Red, White and Blue Bank. Jim may define revenue targets only for nodes 56C and 56E, i.e., Red, White and Blue Bank of New York and Red, White and Blue Bank of California, respectively. For example, Jim may define a revenue target of three million dollars to each of Red, White and Blue Bank branch. Jim may also assign at least one enterprise user 16 to each of nodes 56C and 56E. For example, Jim may assign an enterprise user 16 named Kevin to be responsible for the revenue planning in New York and an enterprise user 16 named Dan to be responsible for the enterprise planning in California.

Jim may further designate Kevin and Dan as analysts 18. Jim may, for example, be a chief financial officer (CFO) for Red, White and Blue Bank. Although Jim only defines revenue targets and enterprise users 16 associated with nodes 56C and 56E of hierarchy 54 in the example illustrated in FIG. 3, Jim may define other attributes of the enterprise planning model. For example, Jim may define templates for collecting contribution data from contributors as well as refine the structure of hierarchy 54. Further, Jim may define revenue targets and enterprise users for all nodes 56 of hierarchy 54.

Upon receiving the defined portion of the enterprise planning model, enterprise planning system 12 notifies analysts 18 associated with cascaded planning stage 61B, i.e., Kevin and Dan, that they may access enterprise planning system 12 and refine the enterprise planning model defined by Jim. As described, refining the enterprise planning model defined by Jim may include further defining another portion of the enterprise planning model as well as refining model data defined in previous planning stages. More specifically, Kevin and Dan may access enterprise planning system 12 to define revenue targets and enterprise users associated with nodes 56H–56L. For example, Dan may access enterprise planning session 12 and distribute the three million dollar revenue target defined by Jim to nodes 56K and 56L, i.e., the mortgage banking department and the commercial banking department. Dan may define a revenue target of one million dollars for the mortgage banking department and a revenue target of two million dollars for the commercial banking department. Dan may further assign enterprise users 16, e.g., Jan and Tim, to be responsible for the enterprise planning in respective departments.

In this manner, the assignment of the defined revenue targets to the lower-level cost units is constrained by the revenue targets provided by the higher-level analysts. For example, Dan must distribute the entire three million dollar revenue target defined by Jim amongst the mortgage banking department and the revenue banking department. Dan may not distribute only a portion of the three million dollar revenue target among the departments. For instance, Dan may not define a revenue target of one million dollars for the mortgage banking department and a revenue target of one million dollars for the commercial banking department. Further, Dan may not distribute revenue targets among the departments that exceed the three million dollar revenue target defined by Jim. Enterprise planning system 12 may validate the revenue targets defined at the lower-level cost units to determine whether the defined revenue targets match the revenue targets provided by the higher-level analysts. Enterprise planning system 12 may require the validation of revenue targets before accepting the input from the lower-level analyst.

In an alternative embodiment, Jim may define revenue targets and enterprise users for all nodes 56 of hierarchy 54. Jim may, for example, distribute the revenue targets to the nodes 56 equally, i.e., nodes 56C and 56E both have a three million dollar revenue target, each of nodes 56H–56J have a one million dollar revenue target, and nodes 56K and 56L have a one and a half million dollar revenue target. However, analysts 18 associated with cascaded planning stage 61B may decide to refine the enterprise planning model defined by analyst 18 associated with cascaded planning stage 61A. More specifically, Dan, i.e., the analyst associated with node 56E may decide to redistribute the defined revenue targets among the mortgage banking department and the commercial banking department. For example, the commercial banking department may be a larger revenue producer and therefore get a larger revenue target. In that case, Dan may decide to assign the mortgage banking department a one million dollar revenue target whereas the commercial banking department receives a two million dollar revenue target. Analysts 18 associated with cascaded planning stage 61B may further refine other model data of the enterprise planning model, e.g., reassign enterprise users with nodes, define or update templates, and the like.

Figure 4:
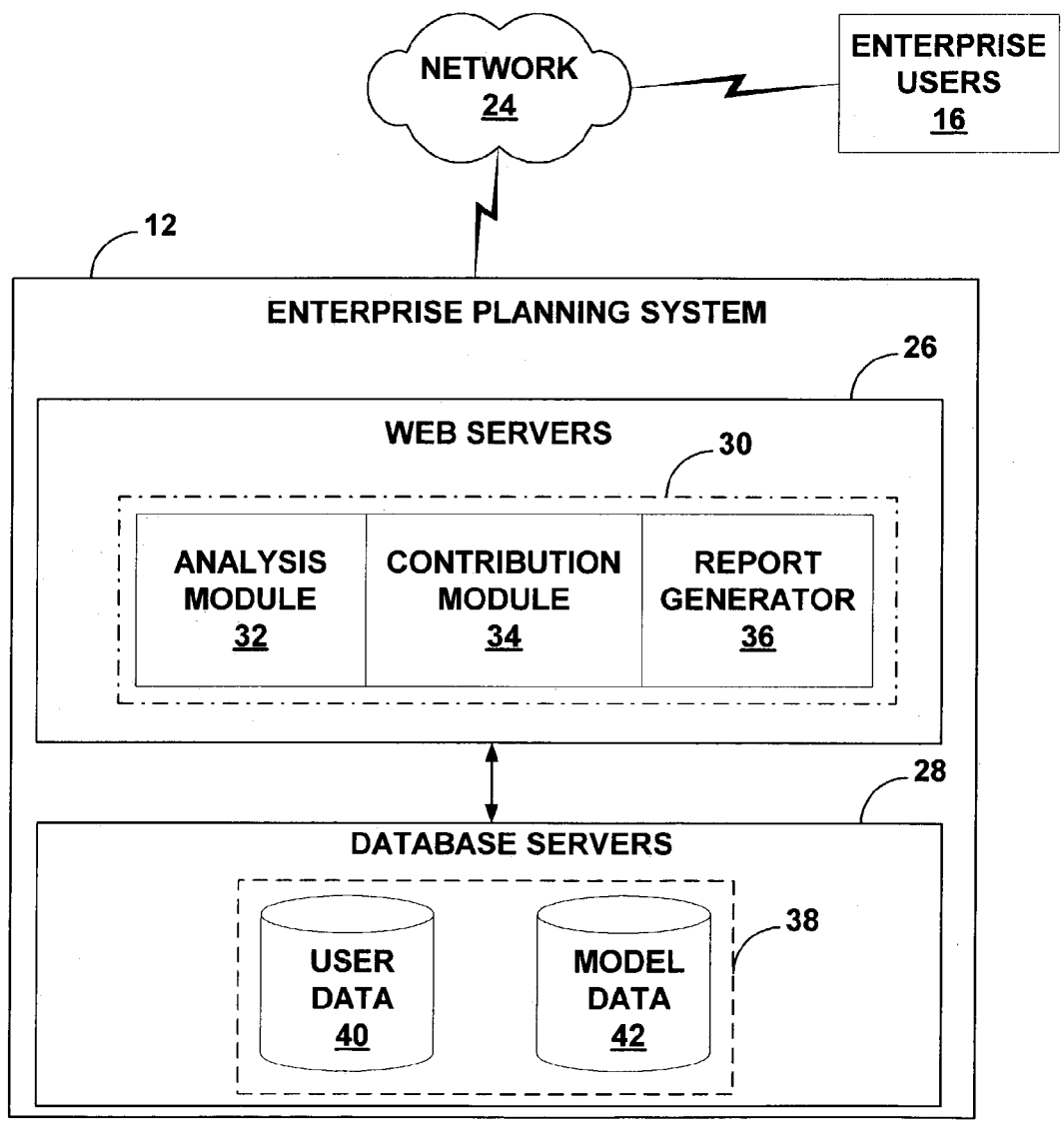
FIG. 4 is a block diagram illustrating an exemplary enterprise planning system.

FIG. 4 is a block diagram illustrating an exemplary enterprise planning system 12 that enables a set of analysts 18 to define an enterprise planning model in cascaded planning stages. In the example illustrated in FIG. 4, enterprise planning system 12 includes web servers 26 and database servers 28. Web servers 26 execute web server software to provide an interface for communicating with enterprise users 16 via network 24. More specifically, web servers 26 provide an environment for interacting with analysts 18, reviewers 20, and contributors 22 according to software modules 30, which include analysis module 32, contribution module 34, and report generator 36.

Software modules 30 may comprise Lotus scripts, Java scripts, Java Applets, Active Server Pages, web pages written in hypertext markup language (HTML) or dynamic HTML, Active X objects, and other suitable modules. Web servers 26 serve up web pages defined by software modules 30, and communicate the web pages to computing devices of enterprise users 16. The web pages may include static media, such as text and graphic imagery, as well as conventional input media such as text entry boxes, radio buttons, drop-down menus, and the like, for receiving information from enterprise users 16.

Software modules 30 interact with database servers 28 to access enterprise data 38, which includes user data 40 and model data 42. Enterprise data 38 may be stored in a number of different forms including one or more data storage files, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. Furthermore, although illustrated separately, enterprise data 42 could be combined into a single database or other data storage structure. User data 40 and model data 42 could, for example, be implemented as a single relational database.

User data 40 stores information for each of enterprise users 16, including a name, an electronic mail (email) address, and other contact information. Model data 42 stores enterprise planning models defined by a set of analysts 18. Model data 42 may include, for example, information that defines a reconciliation process developed by analysts 18, including a number of reconciliation levels, various nodes in an enterprise hierarchy, and enterprise users 16 associated with the nodes. In addition, model data 42 stores respective data entry templates for capturing contribution and review data from enterprise users 16.

Analysis module 32 includes one or more software modules for defining one or more enterprise planning models that control the entire planning process in cascaded planning stages. For example, analysis module 32 allows a set of analysts 18 to define nodes of the enterprise hierarchy, assign enterprise users 16 to the nodes, and define the number of reconciliation stages in the enterprise planning process, i.e., the number of hierarchical levels in cascaded planning stages. In addition, analysis module 32 allows analysts 18 to define corporate target data as well as templates for collecting contribution data from contributors 22.

More specifically, analysis module 32 allows analysts 18 associated with nodes on lower levels of the enterprise hierarchy to access and refine model data 42. In this manner, analysts 18 may access an enterprise planning model defined by one or more analysts 18 associated with nodes of a higher level and refine the enterprise planning model. For example, analysts 18 associated with nodes on a lower level may wish to modify the templates to capture more detailed contribution data than the templates defined by analysts 18 of the higher level nodes. Analysts 18 may define a plurality of planning models for enterprise 14 using analysis module 32. For example, analysts 18 may define separate planning models for different enterprise planning activities such as revenue forecasting, inventory management, resource planning, managing accounts payable, and the like.

Analysis module 32 also allows analysts 18 to define a number of mechanisms for automating the planning process and ensuring that the contributors 22 submit their respective contribution data timely, and that templates quickly move through the defined reconciliation stages. For example, using analysis module 32, analysts 18 can define timers for triggering email messages to remind the contributors 22 to access enterprise planning system 12 and complete a particular template. Further, analysts 18 may define timers for triggering indications to remind analysts of lower levels to refine model data 42. Analysts may also define timers that execute the enterprise planning session when the analysts of lower levels do not make modifications to model data 42 in a timely fashion.

Contribution module 34 includes software modules for presenting the templates to enterprise users 16 designated as contributors 22, and for capturing contribution data from contributors 22. Contribution module 34 may, for example, access model data 42 and present a template associated with contributor 22. Contribution module 34 captures and aggregates the contribution data across enterprise 14 in real-time, and provides access to the aggregated data to reviewers 20 associated with higher levels of enterprise 14.

Report generator 36 includes analytical software modules that generate enterprise planning reports based on the contribution data received from contributors 22 and stored within model data 42. In particular, the analytical software modules allow enterprise users 16, such as analysts 18 and reviewers 20, to formulate complex queries for generating reports and performing other data analysis functions on the current data of the enterprise planning session. These software modules may be web-based modules having a browser interface, or may be stand-alone executable programs.

Figure 5:
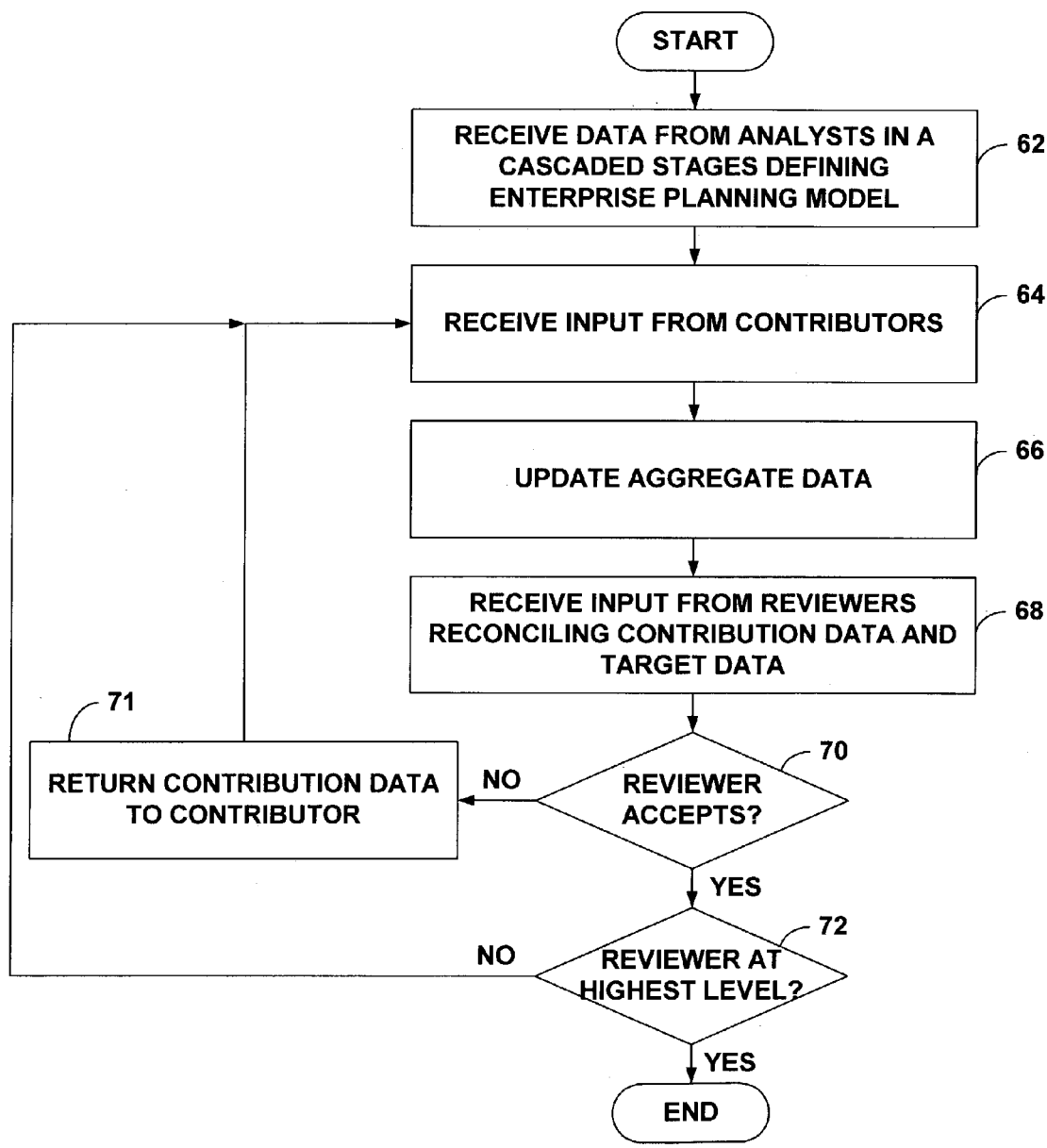
FIG. 5 is a flowchart illustrating an exemplary mode of operation of an enterprise planning system.

FIG. 5 is a flowchart illustrating an exemplary mode of operation of enterprise planning system 12. Enterprise planning system 12 receives data defining an enterprise planning model from a set of analysts 18 in cascaded planning stages (62). The set of analysts 18 interact with enterprise planning system 12 to develop an enterprise planning model that includes an enterprise hierarchy, corporate target data, and templates for collecting data from contributors 22. The enterprise planning model may receive numerous refinements from analysts 18 associated with nodes of different levels of the enterprise hierarchy. For example, enterprise planning system 12 may receive data that defines an enterprise planning model from an analyst 18 associated with a first node of the enterprise hierarchy in a first cascaded planning stage. Analyst 18 of the first node of the enterprise hierarchy may, for example, be an enterprise user 16 assigned to the highest level node. Enterprise planning system 12 interacts with at least one analyst 18 associated with a node of a lower level of the hierarchy and may receive data from analyst 18 associated with the lower level node in a second cascaded planning stage. The data received from analyst 18 associated with the lower level node may refine model data defined by analyst 18 in the first cascaded planning stage. In this manner, model data defining an enterprise planning model flows from top to bottom while being refined by the set of analysts 18 in cascaded planning stages.

Enterprise planning system 12 receives forecast data from contributors 22 (64). Enterprise planning system 12 may, for example, receive a request from one of contributors 22 to access enterprise planning system 12. Enterprise planning system 12 may access enterprise data 38 and communicate one or more associated input templates to contributor 22 in response to the request. If contributor 22 has previously input contribution data, enterprise planning system 12 identifies and retrieves any contribution data previously stored by contributor 22. Contributors 22 may input new contribution data or update contribution data previously stored in the associated templates.

Upon receiving new or updated contribution data from contributors 22, enterprise planning system stores the contribution data in model data 42. Enterprise planning system 12 further identifies higher level nodes that are affected by the new or updated contribution data and updates respective aggregate totals in real-time for each of the identified higher level nodes (66). For instance, using enterprise hierarchy 54 of FIG. 2 as an example, when enterprise planning system 12 receives new or updated contribution data from contributor 22 of node 56G, enterprise planning system 12 identifies higher level nodes 56B and 56A as nodes that are affected by the new or updated contribution data and updates the aggregate totals for nodes 56B and 56A. In this manner, the aggregate totals are readily available for reviewers 20 across enterprise 14.

Reviewers 20 may access enterprise planning system 12 and immediately provide review input either rejecting or accepting the contribution data and the aggregate totals in view of the target data provided by analysts 18 (68). Alternatively, reviewers 20 may only need to review the reconciled data when the contribution data input by contributors 22 exceeds the target data provided by analysts 18. For example, when the reconciled data from contributors 22 is within the specified corporate targets the enterprise planning system 12 may bypass reviewer 20 associated with contributor 22. When reviewers 20 reject the contribution data, enterprise planning system 12 sends the contribution data back to contributor 22 that input the contribution data (70, 71). Contributor 22 may then revise the contribution data and resubmit the revised contribution data.

When reviewer 20 accepts the contribution data, enterprise planning system 14 determines whether reviewer 20 that accepted the contribution data and aggregate totals is the reviewer associated with the node of the highest level of the enterprise hierarchy (70, 72). When reviewer 20 is not at the enterprise user associated with the highest node of the enterprise hierarchy, e.g., node 56A of enterprise hierarchy 54 illustrated in FIG. 2, enterprise planning system 14 repeats the reconciliation process. More particularly, enterprise planning system 14 continues to receive contribution data from contributors 22, aggregate the received contribution data to obtain updated aggregate data, and receive review information from reviewers 20. When reviewer 20 is the enterprise user associated with the highest node of the enterprise hierarchy, the top-down bottom-up enterprise planning session is complete.

Figure 6:
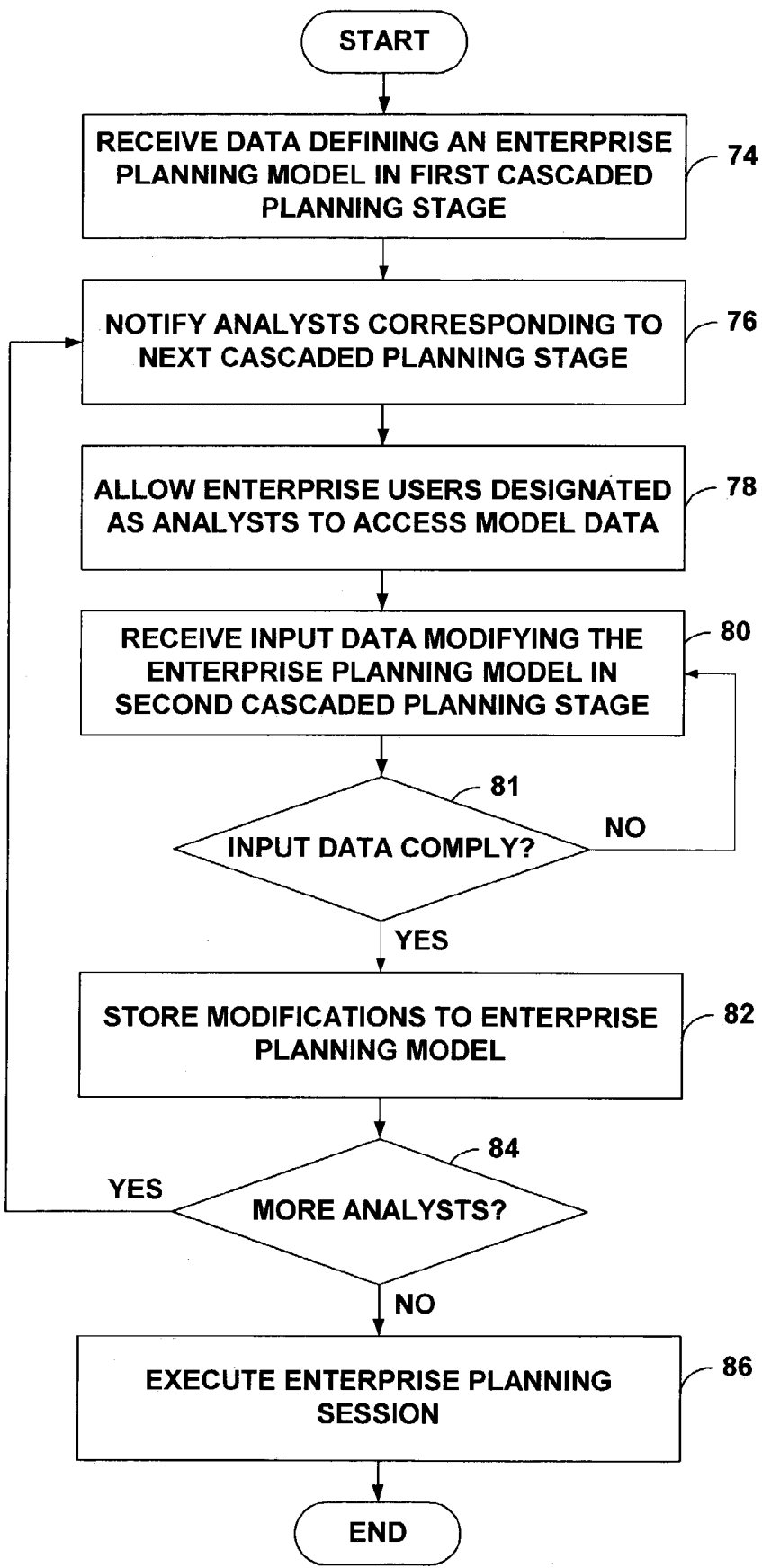
FIG. 6 is a flow diagram illustrating cascaded planning of an enterprise planning session.

FIG. 6 is a flow diagram further illustrating the cascaded planning of an enterprise planning model, e.g., block 62 of FIG. 5. Initially, enterprise planning system 12 receives model data defining at least a portion of an enterprise planning session from an analyst 18 in a first cascaded planning stage (74). Analyst 18 interacts with enterprise planning system 12 to develop an enterprise planning model that includes an enterprise hierarchy, corporate target data, and templates for collecting contribution data. The enterprise hierarchy may have vertically and horizontally arranged nodes 56, such as enterprise hierarchy 54 of FIG. 2. Analyst 18 may further assign one or more enterprise users 16 to each node 56, and designate enterprise users 16 as analysts 18, reviewers 20, contributors 22, or a combination thereof.

Upon submitting the model data, enterprise planning system 12 notifies analysts 18 associated with nodes corresponding to the next cascaded planning stage that they may access enterprise planning system 12 and refine the enterprise planning model (76). Enterprise planning system 12 may, for example, notify analysts 18 corresponding to the next cascaded planning stage via electronic mail. Using enterprise hierarchy 54 of FIG. 3 as an example, upon analyst 18 associated with node 56A, i.e., Jim, submitting model data, enterprise planning system 12 notifies analysts 18 associated with nodes 56C and 56E on reconciliation level 58B to access enterprise planning system 12 and refine the model data.

Enterprise planning system 12 allows analysts 18 associated with the lower level nodes to access the model data defining the enterprise planning model (78). Enterprise planning system 12 may receive data from analysts 18 associated with the lower level nodes that refines the enterprise planning model in a second cascaded planning stage (80). Analysts 18 associated with the lower level nodes 56 may wish to modify the enterprise planning model in accordance with which the enterprise planning session is carried out to accommodate the needs of particular cost centers or contributors 22. For instance, in the case of a bank that has branches operating in multiple states in the United States, analysts 18 associated with lower level nodes 56 may need to refine the enterprise planning model to accommodate different regulatory environments in different states or forecasting strategies for different baseline departments. As described above, analysts 18 associated with the lower level nodes 56 may, for example, refine enterprise planning model by modifying nodes 56 of enterprise hierarchy 54, the corporate target data defined by analysts 18 associated with higher level nodes, or the templates for collecting contribution data from contributors 12.

Upon enterprise planning system 12 receiving input data from analysts 18 associated with the lower level nodes 56, enterprise planning system 12 validates the input data from the lower-level analyst to determine whether the input data complies with the data provided by the higher-level analysts (81). For example, enterprise planning system 12 may validate revenue targets defined at lower-level cost units to determine whether the defined revenue targets match the revenue targets provided by higher-level analysts. In this manner, the input data from the lower-level analysts is constrained by the defined model data provided by the higher-level analysts.

Upon validating the input data from the lower-level analyst, enterprise planning system 12 stores the input data modifying the enterprise planning model (82). Enterprise planning system 12 may, for example, store the input data in model data 42. Enterprise planning system 12 then determines whether there are any more analysts 18 corresponding to lower level nodes of the hierarchy (82). When there are analysts 18 associated with lower level nodes, enterprise planning system 12 notifies the analysts associated with the lower level nodes and continues to refine the enterprise planning model in accordance with input from analysts 18 associated with nodes of lower levels of the hierarchy.

When there are no analysts 18 associated with the lower level nodes, enterprise planning system 12 executes the remaining phases of the enterprise planning session, e.g., the contribution and reconciliation phases (84). Execution of the enterprise planning session includes collecting contribution data from contributors 22 and reconciling the received contribution data with target data. Execution of enterprise planning session further includes receiving reviews from reviewers 20.

Various embodiments of the invention have been described. These and other embodiments are within the scope of the following claims.

The invention claimed is:

1. A method comprising:
receiving model data from a set of enterprise users in an order based on a multi-level enterprise hierarchy in which each of the enterprise users is associated with at least one of a plurality of hierarchically arranged nodes, wherein the model data from each of the enterprise users defines a portion of an enterprise planning model for use within a subsequent enterprise planning session, wherein receiving model data includes receiving model data from one of the enterprise users associated with a first level of the hierarchically arranged nodes in a first planning stage and receiving model data from a second one of the enterprise users associated with a second level of the hierarchically arranged nodes in a second planning stage, wherein the model data received in the second planning stage refines the portion of the enterprise planning model defined in the first enterprise planning stage;
executing software that validates the portion of the model received from each of the users by rejecting the portions of the enterprise planning model received from the enterprise users associated with lower levels of the enterprise hierarchy when the portions of the enterprise planning model fail to comply with the portions of the enterprise planning model provided by the enterprise users associated with the higher levels of the hierarchy;
repeating the validation until the portions of the enterprise planning model have been validated; and
after validation of the enterprise planning model, executing software that conducts the enterprise planning session in accordance with the enterprise planning model by capturing contribution data from a set of contributors associated with the enterprise hierarchy and reconciling the captured contribution data with target data at each level of the hierarchy.

2. The method of claim 1, wherein refining the portion of the enterprise planning model defined in the first planning stage includes further defining another portion of the enterprise planning model.

3. The method of claim 1, wherein the first level is higher in the hierarchy of nodes than the second level.

4. The method of claim 1, wherein the first level and second level are consecutive levels in the hierarchy of nodes.

5. The method of claim 1, wherein receiving data that refines the enterprise planning model includes receiving model data that modifies the plurality of hierarchically arranged nodes.

6. The method of claim 5, wherein receiving model data that modifies the plurality of hierarchically arranged nodes includes at least one of adding a node to the hierarchy and removing a node from the hierarchy.

7. The method of claim 1, wherein receiving model data that refines an enterprise planning model includes receiving model data that assigns enterprise users to the nodes.

8. The method of claim 7, wherein receiving model data that assigns enterprise users to the nodes includes receiving model data that adds an enterprise user to one of the nodes.

9. The method of claim 7, wherein receiving data that assigns enterprise users to the nodes includes receiving model data that removes an enterprise user from one of the nodes.

10. The method of claim 1, further comprising notifying the enterprise user of the second level to modify the enterprise planning model upon the enterprise user of the first level submitting the data defining a portion of the enterprise planning model.

11. The method of claim 10, wherein notifying the enterprise user of the second level of the hierarchy includes sending an electronic mail message to the enterprise user of the second level.

12. The method of claim 1, wherein receiving model data includes receiving corporate target data for each of the nodes.

13. The method of claim 12, wherein receiving model data that refines the enterprise planning model includes receiving model data that updates the corporate target data of a portion of the nodes.

14. The method of claim 13, wherein receiving model data that updates the corporate target data of the nodes includes data that distributes the corporate target data among the nodes.

15. The method of claim 1, further comprising receiving model data that defines templates for collecting the contribution data from the contributors.

16. The method of claim 15, further comprising receiving additional model data that modifies the defined templates.

17. The method of claim 15, further comprising receiving additional model data that defines a new template.

18. The method of claim 1, wherein executing software that conducts the enterprise planning session includes:
receiving the contribution data from the contributors beginning with a lowest level of the hierarchy and working up the enterprise hierarchy; and aggregating the contribution data from the enterprise users to reconcile the contribution data with enterprise targets in real-time.

19. The method of claim 18, further comprising:
allowing an enterprise contributor to view the aggregated contribution data;
receiving a rejection from the enterprise contributor viewing the aggregated contribution data; and
notifying the enterprise contributor that input the contribution data of the rejection.

20. A system comprising:
an analysis module to receive model data from a set of enterprise users in an order based on a multi-level enterprise hierarchy, in which each of the enterprise users is associated with at least one of a plurality of hierarchically arranged nodes, wherein the model data from each of the enterprise users defines a portion of an enterprise planning model for use within a subsequent enterprise planning session,
wherein the analysis module obtains model data that defines at least a portion of the enterprise planning model from one of the enterprise users associated with a first level of the hierarchically arranged nodes in a first planning stage, and obtains model data from one of the enterprise users associated with a second level of the hierarchically arranged nodes in a second planning stage, wherein the model data obtained in the second planning stage refines the portion of the enterprise planning model defined in the first enterprise planning stage, and
wherein the analysis module validates the portion of the model received from each of the enterprise users by rejecting portions of the model received from the enterprise users associated with lower levels of the enterprise hierarchy when the portions of the model fail to comply with the portions of the model provided by the enterprise users associated with the higher levels of the hierarchy;
a database to store the model data that defines the enterprise planning model; and
a contribution module to conduct the enterprise planning session in accordance with the model by capturing contribution data from a set of contributors associated with the enterprise hierarchy and reconciling the captured contribution data with target data at each level of the hierarchy.

21. The system of claim 20, wherein the model data obtained in the second planning stage further defines another portion of the enterprise planning model.

22. The system of claim 20, wherein the model data obtained from the enterprise user associated with the second level modifies the hierarchically arranged nodes.

23. The system of claim 22, wherein the model data obtained from the enterprise user associated with the second level adds a node to the hierarchically arranged nodes.

24. The system of claim 22, wherein the model data obtained from the enterprise user associated with the second level removes a node from the hierarchically arranged nodes.

25. The system of claim 20, wherein the model data obtained from the enterprise user of the first level associates an enterprise user with at least one of the nodes of the hierarchy.

26. The system of claim 25, wherein the model data obtained from the enterprise user associated with the second level modifies the association between at least one of the nodes and the enterprise user associated with the node.

27. The system of claim 26, wherein the model data from the enterprise user associated with the second level associates an additional enterprise user with one of the nodes.

28. The system of claim 20, wherein the model data obtained from the enterprise user associated with the first level defines target data for the enterprise.

29. The system of claim 28, wherein the target data is defined for each of the nodes of the hierarchy.

30. The system of claim 29, wherein the model data obtained from the enterprise user associated with the second level modifies the target data.

31. The system of claim 20, wherein the model data obtained from the enterprise user associated with the first level defines one or more templates for collecting contribution data.

32. The system of claim 31, wherein the model data obtained from the enterprise user associated with the second level modifies at least one of the defined templates.

33. The system of claim 31, wherein the model data obtained from the enterprise user associated with the second level defines a new template.

34. The system of claim 20, wherein the first level is higher in the hierarchy of nodes than the second level.

35. The system of claim 20, wherein the first level and second level are consecutive levels in the hierarchy of nodes.

36. The system of claim 20, wherein the contribution data is stored in the database and the contribution module interacts with enterprise users to allow for review of the contribution data.

37. A computer-implemented method comprising:
presenting an interface to receive model data from a set of enterprise users in an order based on a multi-level hierarchy that associates each of the enterprise users with at least one of a plurality of hierarchically arranged nodes wherein the model data from each of the enterprise users defines a portion of an enterprise model for use within a subsequent enterprise planning session; wherein presenting an interface includes:
(i) presenting an interface to receive model data that defines at least a portion of the enterprise planning model from an enterprise user associated with a first level of the hierarchically arranged nodes in a first planning stage, and
(ii) presenting an interface to receive model data from an enterprise user associated with a second level of the hierarchically arranged nodes in a second planning stage, wherein the model data received in the second planning stage refines the portion of the enterprise planning model defined in the first enterprise planning stage;
executing an analysis module to validate the portion of the model received from each of the users by rejecting portions of the model received from the enterprise users associated with lower levels of the enterprise hierarchy when the portions of the model fail to comply with the portions of the model provided by the enterprise users associated with the higher levels of the hierarchy; and
after validation of the model, executing a contribution module to conduct the enterprise planning session in accordance with the model by capturing contribution data from a set of contributors associated with the enterprise hierarchy and reconciling the captured contribution data with target data at each level of the hierarchy.

38. The method of claim 37, wherein the network comprises one of a local area network, a wide area network, and a wireless area network.

* * * * *